United States Patent [19]

Ono

[11] Patent Number: 4,875,056

[45] Date of Patent: Oct. 17, 1989

[54] THERMAL RECORDING APPARATUS WITH VARIABLY CONTROLLED ENERGIZATION OF THE HEATING ELEMENTS THEREOF

[75] Inventor: Takeshi Ono, Yokohama, Japan

[73] Assignee: Canon Kabushiki Kaisha, Tokyo, Japan

[21] Appl. No.: 2,204

[22] Filed: Jan. 12, 1987

[30] Foreign Application Priority Data

Jan. 17, 1986 [JP] Japan .................................... 61-6348
Jan. 30, 1986 [JP] Japan .................................... 61-16752

[51] Int. Cl.[4] .......................... G01D 15/10; B41J 3/20
[52] U.S. Cl. ................................ 346/76 PH; 400/120
[58] Field of Search ................... 346/76 PH; 400/120; 219/216

[56] References Cited

U.S. PATENT DOCUMENTS

| | | | |
|---|---|---|---|
| 4,070,587 | 1/1978 | Hanakata | 307/141 |
| 4,366,545 | 12/1982 | Kawanabe | 364/569 |
| 4,370,666 | 1/1983 | Noda et al. | 346/76 PH |
| 4,407,003 | 9/1983 | Fukui | 346/76 PH |
| 4,415,908 | 11/1983 | Sugiura | 346/76 PH |
| 4,475,114 | 10/1984 | Koyama et al. | 346/76 PH |
| 4,510,505 | 4/1985 | Fukui | 346/76 PH |
| 4,510,507 | 4/1985 | Ishikawa | 346/76 PH |
| 4,536,774 | 8/1985 | Invi et al. | 346/76 PH |
| 4,590,488 | 5/1986 | Sullivan | 346/76 PH |
| 4,591,876 | 5/1986 | Nozaki et al. | 346/76 PH |
| 4,693,618 | 9/1987 | Hanagata | 400/120 |
| 4,719,473 | 1/1988 | Shimamura | 346/76 PH |

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

A thermal recording apparatus variably controls the amount of energy supplied to heating elements in accordance with the relative length of a recording time interval between lines effected by linearly arranged heating elements constituted by a plurality of resistors. In another embodiment the heating elements are provided in a plurality of individually controllable blocks and the energy supplied to the heating elements in each block is variably controlled in accordance with the number of heating elements to be energized in that block.

12 Claims, 3 Drawing Sheets

THERMAL RECORDING APPARATUS WITH VARIABLY CONTROLLED ENERGIZATION OF THE HEATING ELEMENTS THEREOF

BACKGROUND OF THE INVENTION

1. Field of the Invention

The present invention relates to a thermal recording apparatus, and, more particularly, to a thermal recording apparatus such as a thermal printer or a heat transfer printer which has heating elements with variably controlled energization.

2. Description of the Prior Art

In a facsimile apparatus, for instance, the energy supplied to the recording elements, such as the heating elements in a thermal recording apparatus, is controlled in accordance with a reception mode (G3 mode or G2 mode), a standard or fine mode, or a mode for each document.

With such conventional structure, the time required for encoding and decoding one line can vary depending on the image pattern and, when variations occur in the recording cycle for each line, irregularities may occur in the density of the recorded image.

For instance, in a fine recording mode which generally has a longer recording cycle than the standard mode, the amount of energy supplied to the heating elements is set relatively high. However, when lines having complicated image patterns and simple image patterns are present on a single page, the processing time required for decoding, such as determining the run length, will be short for lines in which the pattern is simple and, since such line will thus be recorded very shortly after the preceding line, the heating elements may accumulate heat, so that the recorded image is to dark.

Conversely, for a line which has a complicated pattern, and a long recording cycle, heat will not be accumulated from recording of the preceding line, so that the recorded image may become lighter, and thus irregularities in density may occur in one page of the recorded image.

Consequently, attempts have been made to control heat generation in this type of apparatus by taking into account the heat accumulated by the recording head and thus maintain high-quality recording. One method uses a thermistor or other temperature detecting device in the recording head, and the amount of heat generated is controlled by controlling the drive of the heating elements in accordance with the output of the detecting device. In another method, heat generation is controlled in accordance with the number of black dots (recording dots) in the recording data. Nevertheless, these conventional methods have not resulted in a significant improvement in recording quality, and irregularities in the density of the recorded image still may occur.

For instance, in a thermal printer for a facsimile apparatus, image data received by a main control unit is decoded from a mode such as MH or MR code and the decoded data is subsequently received and recorded by the printer, so that the recording time interval per line may not be constant. Consequently, the amount of heat generated by the head per line may vary, thereby resulting in irregularities in the density of the recorded image, because the thermistor cannot provide a sufficiently accurate temperature detection.

In addition, with a conventional system which controls the amount of heat generated by controlling the drive of the heating elements on the basis of the number of recording dots in a line of the recording data, irregularities in the density of the recorded image may still occur, particularly in a line-type head, if there is an uneven distribution of recording dots within a line, since the amount of heat generated is controlled on the basis of the number of recording dots in the entire line.

SUMMARY OF THE INVENTION

Accordingly, a primary object of the present invention is to provide a thermal recording apparatus which overcomes the aforementioned drawbacks of the prior art.

In accordance with one aspect of the invention, the present invention provides a thermal recording apparatus comprising timing means for counting the time interval between consecutive recording lines and control means for variably controlling the amount of energy supplied to heating elements in accordance with the length of that time interval, whereby irregularities in recording density from line to line may be reduced.

In accordance with another aspect of the invention, a thermal recording apparatus comprises control means for variably controlling the amount of energy supplied to heating elements in accordance with the number of heating elements selected for energization in each recording cycle.

According to still another aspect of the invention, a thermal recording apparatus comprises a plurality of heating elements, provided as a plurality of individually controllable blocks, and control means for variably controlling the amount of energy supplied to heating elements in each block in accordance with the number of heating elements selected for energization in each block.

Those and other objects of the present invention will become apparent from the following detailed description of the present invention, when read in conjunction with the accompanying drawings.

DETAILED DESCRIPTION OF THE PREFERRED EMBODIMENTS

A detailed description of preferred embodiments of the present invention will now be made with reference to the accompanying drawings.

Figure 1:
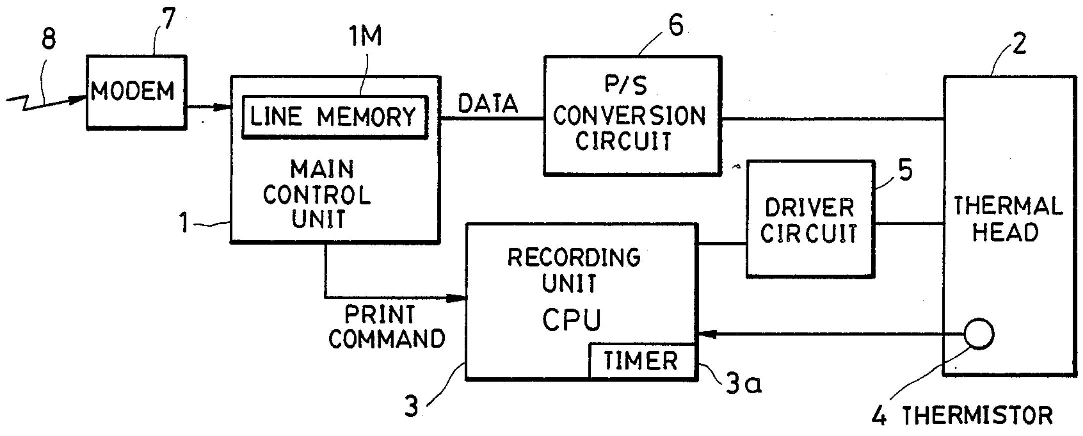
FIG. 1 is a schematic block diagram of a thermal recording apparatus in accordance with a first embodiment of the present invention.

FIG. 1 is a block diagram of a first embodiment of a recording system for a facsimile apparatus. A main control unit 1 decodes an image code, such as a compressed image signal, and also may control functions such as the reading and transmission of a document image, although these functions are omitted from the drawing.

A thermal head 2, having a plurality of heating resistors, is provided with a thermistor 4 which is a means for sensing the temperature of the thermal head. The thermal head 2 is a full-line type which can record an entire line on a recording medium at one time.

A recording unit CPU 3 receives a command from the main control unit 1, determines the amount of energy to be applied to the heating elements of the thermal head, and drives the heating elements of the thermal head 2 via a driver circuit 5.

In addition, the recording unit CPU 3 is provided with a cycle timer 3*a* which operates in accordance with a computer program. This cycle timer has the function of counting the time interval from the completion of recording of a preceding line until the start of recording the next line.

A parallel/serial conversion circuit 6 is provided for converting parallel recording data from the main control unit 1 into serial recording data, to enable the data to be transmitted to the thermal head 2.

A modem 7 transmits the compressed image signal to the main control unit 1 over a telephone line 8.

Figure 2:
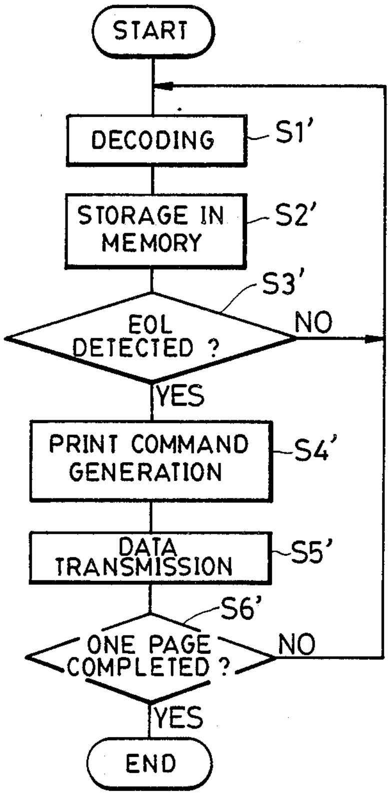
FIG. 2 is a flowchart schematically depicting the operation of the main control unit shown in FIG. 1.
Figure 3:
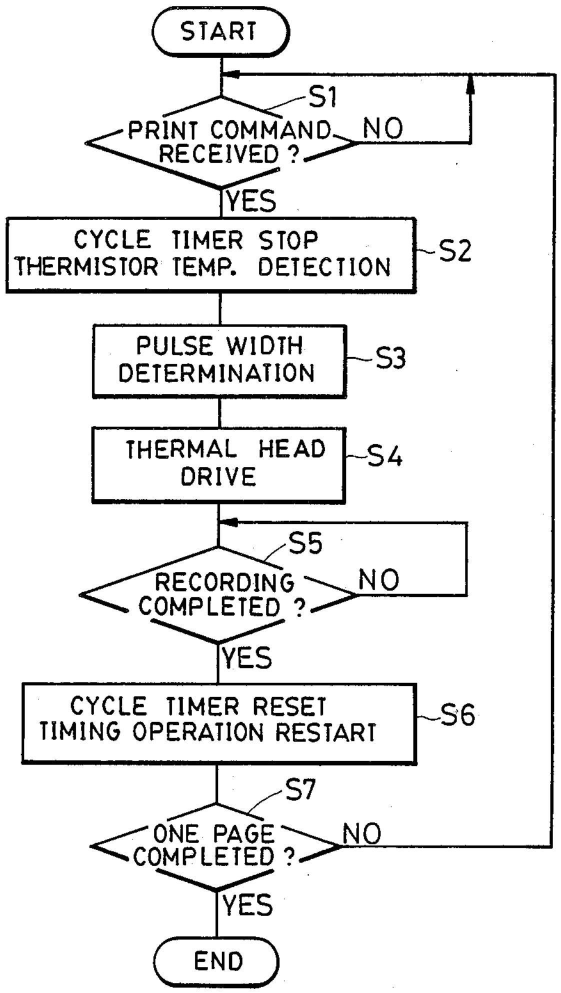
FIG. 3 is a flowchart schematically depicting the operation of the recording unit CPU shown in FIG. 1.

With the above-described arrangement, control is effected in this embodiment in accordance with the flowcharts in FIGS. 2 and 3.

First, the main control unit 1 transmits one line of recording data via the parallel/serial data conversion circuit (P/S conversion circuit) 6, and transmits a print command to the recording unit CPU 3. The operation of the control of the main control unit 1 is depicted in FIG. 2.

Image codes such as MH and MR codes obtained from the modem 7 are decoded consecutively and are stored (Steps S1' and S2') in a line memory 1M inside the main control unit 1 as binary data. That is, if a heating element is to be energized, the memory 1M might store a "1" for that heating element and a "0" for other heating elements. When the end of the decoded line is detected by EOL (the end-of-line code) (Step S3'), the main control unit 1 transmits a print command to the recording unit CPU 3 (Step S4'), and transmits the binary black and white data to the P/S conversion circuit 6 in groups of 8 or 16 bits (Step S5').

The amount of decoding required for this line depends on the amount of code information, and the operations of Steps S1' to S5' are repeated until the codes for one page have been decoded and output is completed (Step S6').

The recording unit CPU 3 determines whether or not a print command from the main control unit 1 has been received (in Step S1 of FIG. 3). If YES is the answer, the cycle timer 3*a* which has been counting from the completion of the recording of the preceding line is stopped (in Step S2), and the temperature of the thermal head 2 is sensed by the thermistor 4.

Subsequently, the recording unit CPU 3 determines (in Step S3) the time counted by the cycle timer, as well as the amount of thermal energy to be applied to the recording elements in accordance with the temperature of the thermistor 4. At this point, the width of the pulse used to drive the heating elements of the thermal head is variably controlled.

It should be noted that the temperature detected by the thermistor 4 is not the temperature of the resistors constituting the heating elements, but the temperature of a heat-radiating plate of the thermal head 2. While using this temperature alone may enable control sufficient to prevent overheating of the thermal head, it is insufficiently accurate as an indication of the temperature of the heating elements to alone eliminate irregularities of the density of a recorded image on one page.

Accordingly, this embodiment of the present invention a system whereby a table of pulse widths corresponding to the temperature detected by the thermistor is provided, and the pulse width is increased or decreased in accordance with a value from this table and the time interval between the preceding line and the next line.

Consequently, the pulse width will be small when this recording cycle time interval is short, and large when it is long.

When the time interval between the preceding line and the next line is long, a value representing a voltage application time is further added to the pulse width read from the table, but this value is selected in such a way that it is shorter than the recording cycle, so that there will be no loss in recording time.

After the pulse width has been determined as described above, energy in the form of voltage is supplied (in Step S4) to the heating elements of the thermal head and effect recording.

If it is judged in Step S5 that recording has been completed, the cycle timer is reset in Step S6 and the counting of the next time interval is started.

The above operations are then repeated until the recording of one page is completed (Steps S6' and S7).

Since the present embodiment is arranged as described above, it is possible to control the amount of energy to be applied, by taking into account the time interval between lines in addition to the temperature of the thermal head, so that it is possible to prevent the occurrence of irregularities in the density of the image within one page.

Although, in the aforementioned embodiment, control of the pulse width is used as the means for controlling the amount of energy supplied to the heating elements, control of the applied voltage, applied current, number of pulses, or the like, may also be used.

In addition, since the recording unit CPU 3 counts a time interval, even if the main control unit does not transmit a recording mode such as as fine, standard, G2 or G3 to the recording unit, it is possible to control the amount of energy supplied to the heating elements to be large when the recording cycle becomes longer, and to be small when it becomes shorter.

In this first embodiment, the recording unit CPU counts time and controls the pulse width, but a system may alternatively be used in which the main control unit has a timer to provide control and drive the system directly.

Next, a second embodiment of the present invention is depicted in FIGS. 4 to 7.

Figure 4:
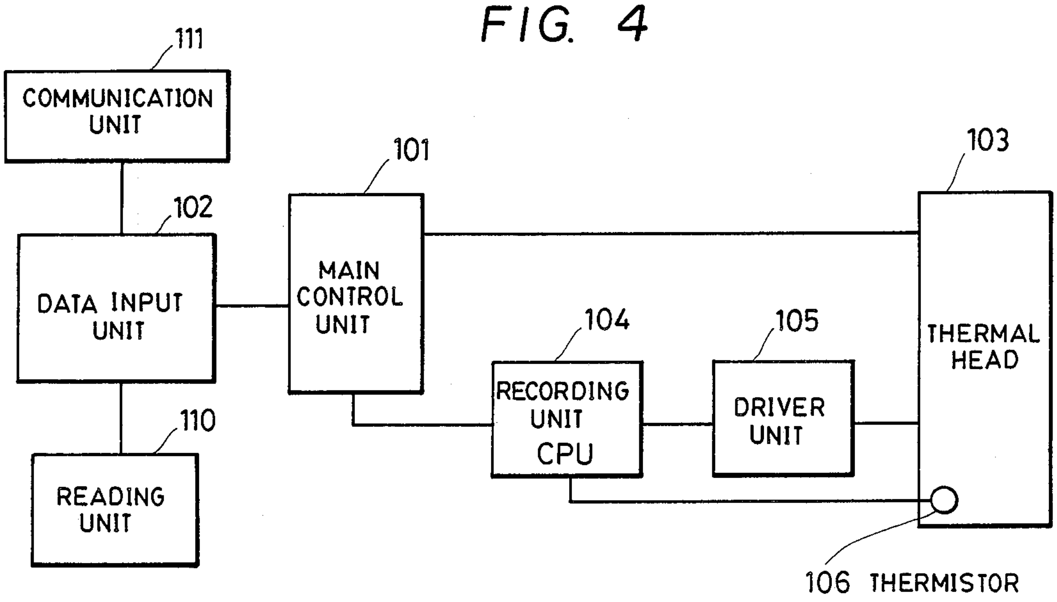
FIG. 4 is a schematic block diagram of a thermal recording apparatus in accordance with a second embodiment of the present invention.

FIG. 4 illustrates an arrangement of a thermal recording apparatus in accordance with a second embodiment of the present invention, as well as a facsimile apparatus including the same. In the drawing, a main control unit 101, which controls all the operations of the facsimile apparatus, including communication, recording, and display, comprises a microcomputer and memory devices such as ROMs and RAMs. A data input unit 102 receives image data to be read and reception image data to be recorded (such as compressed image signals) from a communication unit 111, a reading unit 110, a modem, an NCU, or the like (only the communication unit and reading unit being shown in FIG. 4) and inputs the data to the main control unit 101.

In the illustrated case, in order to effect recording with 2048 dots, a thermal head 103 in which that number of resistors are arranged along the width of the recording medium (such as thermosensitive paper) is provided with a thermistor 106 as a temperature detecting means.

The recording by the thermal head 103 is controlled by a recording unit CPU 104 and a driver circuit 105. When the thermal head 103 is driven on the basis of the recording data supplied from the main control unit 101, the recording unit CPU 104 controls given quantity parameters regarding recording and driving of the thermal head 103, for example, driving time, driving voltage, and the number of drive pulses to be supplied to the heating elements. This control is efected by the driver circuit 105, which may include switching transistors, known driver elements, shift registers, and latching elements, thereby to control the amount of heat generated by the thermal head. In this second embodiment, the amount of heat generated at that time is controlled on the basis of the following parameters: the time interval for recording one line (in the case of this embodiment, this corresponds to the time required for decoding the image signal in the facsimile apparatus, the time required for communication being included in some cases), the number of heating elements to be selected for energization (black dots) for each block of the heating elements of the thermal head 103, which are provided in individually controllable blocks as will be described later, and the temperature detected by the thermistor 106 mounted on the thermal head 103.

Figure 5:
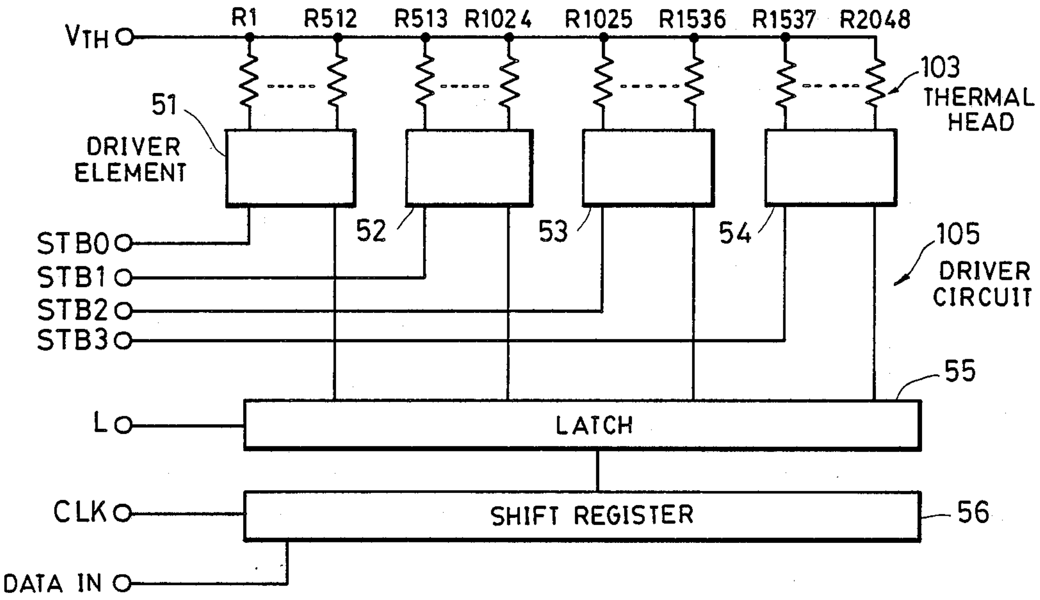
FIG. 5 is a schematic block diagram illustrating further details of the driver unit shown in FIG. 4.

FIG. 5 shows an example of the thermal head 103 and the driver circuit 105. As shown, the thermal head 103 is constituted by 2048 heating resistors R1–R2048. These heating resistors R1–R2048 are divided into four individually controllable blocks of 512 elements each, and these blocks are respectively connected to driver elements 51–54 constituted by an equivalent number of switching devices, such as transistors. The driver elements 51–54 are respectively strobed by strobe signals STB0–STB3. Accordingly, the resistors R1–R2048 are not driven simultaneously but individually in divided units of 512 resistors each. Such an arrangement is useful for reducing instantaneous power consumption.

The recording data to be supplied to the driver elements 51–54 are stored in a latch 55. In other words, one line of serial-mode recording data from the recording CPU 104 or the main control unit 101 is stored in a shift register 56 in synchronization with a clock CLK. When the recording data for 2048 dots have been stored in the shift register 56, the recording data are held as parallel data in the latch 55 by inputting a latch signal L. This latching operation allows control input corresponding to the respective resistors of the driver elements 51–54 to be altered in accordance with the data, and this completes preparations for simultaneous energization of the heating elements in each block using the strobe signals STB0–STB3.

Figure 6:
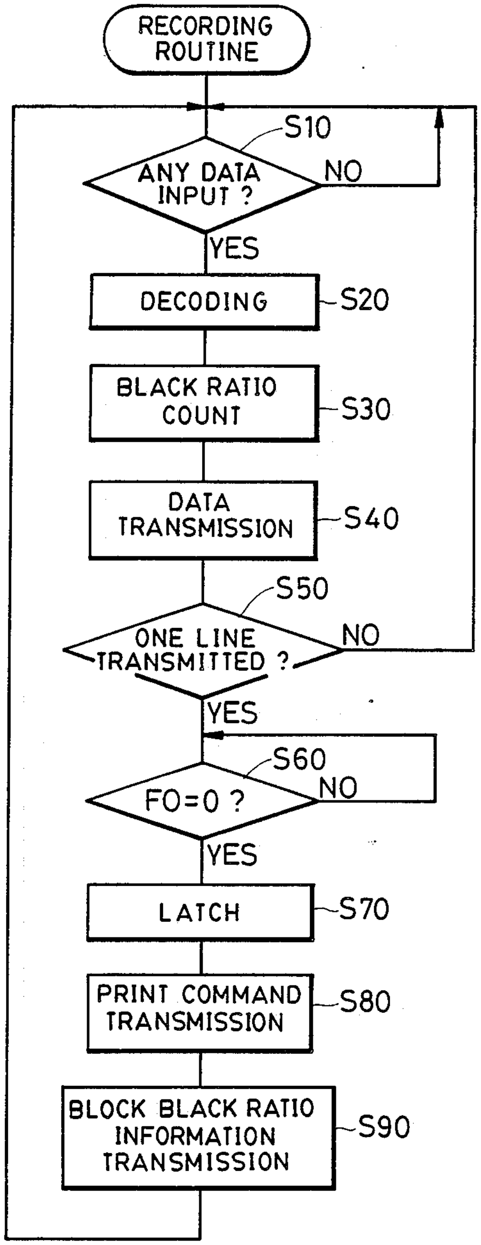
FIG. 6 is a flowchart schematically depicting the operation of the main control unit shown in FIG. 4.
Figure 7:
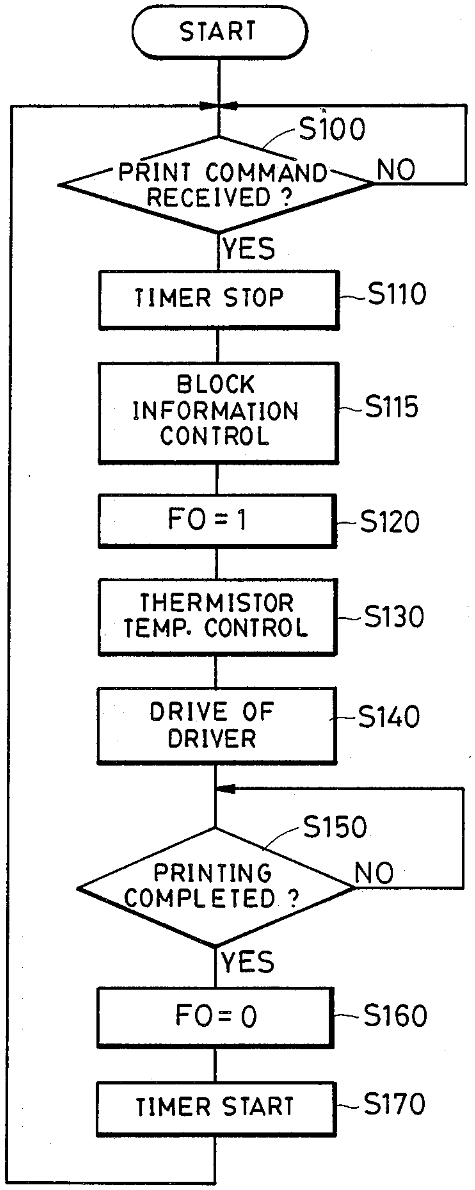
FIG. 7 is a flowchart schematically depicting the operation of the recording unit CPU shown in FIG. 4.

The operation of the above-described arrangement will now be described. FIGS. 6 and 7 are flowcharts illustrating the procedures for controlling the main control unit 101 and the recording unit CPU 104, respectively. The steps illustrated in FIGS. 6 and 7 are stored in a storage means such as a ROM (not shown) by way of a control program.

In Step S10 in FIG. 6, the main control unit 101 judges whether or not image data received via the communication unit 111 (or read by a reading unit in the case of a copy operation) has been input to the data input unit 102, and if YES, the operation proceeds to Step S20.

In Step S20, the main control unit 101 decodes the input image data from a mode such as MH or MR code. Subsequently, the "black rate" of data decoded in Step S30, i.e., the ratio of the number of black dots to the number of the heating resistors is determined for each of the four blocks of heating resistors. Specifically, since the number of heating elements for each block is constant, it suffices to count the number of black dots, or resistors selected for driving by the image signal, in each block.

In Step S40, the decoded recording signal (data) is transmitted to the shift register 56 of the driver circuit 105, as shown in FIG. 5, in synchronization with the clock CLK.

The operations of the foregoing steps S10–S40 are repeated until it is confirmed in Step 50 that the transmission of data for one line with 2048 dots has been completed.

When data for one line have been stored in the shift register 56, the status of a flag F0 is judged in Step S60. The flag F0 is reset by the recording unit CPU 104, as will be described later, and indicates whether or not the recording of data for one line has been completed. In other words, if the flag F0 has not been reset (=1), the next line cannot be recorded, and the operation therefore assumes a standby status in Step 60.

If the flag F0 is reset (=0), the operation proceeds to Step S70, and the data of the next line is moved to the latch 55 so as to store such data in it. In other words, the latch signal L is input to the latch 55.

In Step S80, a print command signal is sent to the recording unit CPU 104, and, in Step S90, a signal representing the number of selected heating elements for each block of the thermal head 103, which was determined in Step S30, is also supplied to the recording unit CPU 104.

Meanwhile, the print command signal transmitted in Step S80 is detected by the recording unit CPU 104 in Step S100 shown in FIG. 7. Upon receipt by the recording unit CPU 104 of the print command, the operation proceeds to Step S110, and stops the timer which has been started, as will be described later. This timer is constituted by hardware devices or the software of the recording unit CPU 104, or the like, and is used to count a time interval in the recording cycle, in this case the time from the completion of recording until the inputting of the next command, mainly the time required for decoding the image signal.

Subsequently, in Step 115, the amount of heat generated by the thermal head 103 is controlled for each block. In other words, in this Step 115, the drive parameters (such as the driving time and driving voltage, which will be collectively referred to hereafter as "driving time") for heat generation by each block of heating elements are compensated in correspondence with the number of heating elements selected for energization in each block in accordance with the information transmitted in Step S90, and, at the same time, the driving time (pulse width, for example) is compensated for each block on the basis of the time interval counted by the timer, which was stopped in Step S110. Specifically, for a block where the number of resistors driven for recording is numerous, driving time is set longer than a standard value. This will compensate for a reduction in the amount of heat generated as the result of a decrease in the electric current values of the individual heating resistors. Meanwhile, in a case where the interval counted by the timer is large and the recording cycle is long, driving time is extended to compensate for a reduction in the amount of accumulated heat resulting from heat radiation by the head. Conversely, when the recording cycle period is short, the driving time is reduced to prevent overheating of the head.

Subsequently, in Step S120, the recording unit CPU 104 sets (=1) the flag F0 to inhibit inputting of new data being recorded (see Step S60).

In addition, in Step S130, the value detected by the thermistor 106 is read, and the driving time for each block of the thermal head 103 is ultimately compensated on the basis of such detected value. The method of compensation referred to here is such that, as in the case of a conventional system, the driving time for each block is reduced by a predetermined amount (or by a predetermined rate) when the thermal head is overheated.

In Step S140, the strobe signals STB0–STB3 are provided for by the finally determined driving time, and the heating resistors of each block of the thermal head 103 are energized on the basis of data provided to the latch 55.

Subsequently, in Step S150, the completion of recording is detected by confirming whether or not energization of the resistors has been completed in Step S140. If the completion of recording has been detected, the flag F0 is reset in Step S160, to permit the main control unit 101 to input data for the next line.

In Step S170, the timer is started to count the time interval until the print command signal for the next line is given. Incidentally, the operation of the timer is not to be restricted to operation as in the embodiment described above; for example, a time interval in a recording cycle may include recording time, by restarting the timer after Step S110.

According to the above-described arrangement, since the amount of energy supplied to the heating elements is controlled in accordance with the number of heating elements selected for energization in each block of the thermal head 103, there is no reduction in the recording quality, such as irregularities in the density within a line. In addition, since the amount of energy is also compensated in accordance with a time interval for each line, even if variation occurs in the time interval, such as variations in the time required for data decoding by the main control unit 101, variations in recording density resulting from heat radiated by the thermal head do not occur. Furthermore, since in this embodiment the temperature of the thermal head is compensated by the thermistor 106, damage or reduction in recording quality caused by overheating of the head will not occur.

Although both of the above embodiments have been described with reference to the case of a thermal printer for a facsimile apparatus, it goes without saying that the present invention can be implemented for a thermal printer apparatus of other systems, such as a heat transfer recorder using an ink ribbon. In addition, although a full-line type thermal head having a unidimensional arrangement has been described by way of example in the above-described embodiments, the technique of the present invention may also be applied to an apparatus employing two-dimensionally arranged heating elements or a scanning-type thermal recording apparatus.

As is apparent from the foregoing description, in accordance with one aspect of the present invention, an arrangement is adopted in which the energy supplied to heating elements is controlled in accordance with a time interval in the recording cycle, it becomes possible to prevent the occurrence of irregularities in the density of a recorded image.

In addition, in accordance with another aspect of the present invention, an arrangement is adopted in which a thermal recording apparatus having heating elements constituted by a plurality of heating resistors provided as a plurality of individually controllable blocks comprises means for determining the number of heating elements selected for driving in each block and thus controls the amount of heat generated by the thermal head and the amount of energy supplied to the selected heating elements in each block in accordance with the number of selected heating elements determined by the determining means. Consequently, it becomes possible to provide an improved thermal recording apparatus which is capable of obtaining stable, high-quality recording irrespective of an uneven distribution of recording data in one unit of image data.

It is to be understood that the present invention is not to be restricted to the above-described embodiments, but that various other applications and modifications are possible within the scope of the invention, which is solely defined in the following claims.

What is claimed is:

1. A thermal recording apparatus for recording on a recording medium, the apparatus comprising:

a recording head having a plurality of heating elements, provided as a plurality of individually controllable blocks, for recording on the recording medium when selected said heating elements are energized during recording cycles;

determining means for respectively determining the number of heating elements selected for energization in each of said blocks in the recording cycle; and control means for variably and respectively controlling the amount of energy supplied to said selected heating elements in each of said blocks in accordance with the number of said heating elements determined by said determining means.

2. A thermal recording apparatus according to claim 1, wherein energy is supplied to said selected heating elements in pulses and said control means variably controls the width of the pulses.

3. A thermal recording apparatus according to claim 1, further comprising timing means for measuring a time interval during each recording cycle, wherein said control means increases the amount of energy supplied to said selected heating elements in correspondence with the time interval measured by said timing means.

4. A thermal recording apparatus according to claim 1, wherein said control means increases the amount of energy supplied to said selected heating elements in correspondence with the number of said heating elements determined by said determining means.

5. A thermal recording apparatus according to claim 3 further comprising detection means for detecting the temperature of said recording read, wherein said control means variably controls the amount of energy supplied to said selected heating elements in accordance with the output of said detection means, the time interval measured by said timing means, and the number of said heating elements determined by said determining means.

6. A thermal recording apparatus according to claim 5, further comprising means for decoding a coded image signal and command means for providing a print command signal after the coded image signal has been decoded and the number of said selected heating elements has been determined, wherein each recording cycle records one line on the recording medium, the print command signal terminates the measuring operation of the timing means and initiates the operation of said detection means and said control means to effect recording of one line of the decoded signal on the recording medium, and the counting operation of said timing means is initiated upon completion of the recording of a line on the recording medium.

7. A thermal recording apparatus according to claim 1, further comprising decoding means for decoding a compressed image signal for each recording cycle and supplying means for supplying the decoded signal to said heating elements.

8. A thermal recording apparatus according to claim 3, wherein said recording means records plural lines on the recording medium line by line and the time interval is a time period falling between the completion of recording of one line and the beginning of recording of the next line.

9. A thermal recording apparatus according to claim 8, wherein the time interval is the time from completion of recording of one line until the beginning of recording of the next line.

10. A thermal recording apparatus according to claim 1, further comprising detection means for detecting the temperature generated by said heating elements, wherein said control means variably controls the amount of energy transmitted to said heating elements in accordance with the output of said detection means and the number of said determining means.

11. A thermal recording apparatus according to claim 10, further comprising decoding means for decoding a compressed image signal for each recording cycle and supplying means for supplying the decoded signal to said heating elements.

12. A thermal recording apparatus according to claim 3, further comprising decoding means for decoding a compressed image signal for each recording cycle and supplying means for supplying the decoded signal to said heating elements.

* * * * *

UNITED STATES PATENT AND TRADEMARK OFFICE

CERTIFICATE OF CORRECTION

PATENT NO. : 4,875,056

DATED : October 17, 1989

INVENTOR(S) : Takeshi Ono

It is certified that error appears in the above-identified patent and that said Letters Patent is hereby corrected as shown below:

COLUMN 1:

Line 35, "to" should read --too--.

COLUMN 4:

Line 8, "tion" should read --tion uses--.

COLUMN 8:

Line 65, "recording read" should read --recording head--.

COLUMN 9:

Line 15, "counting" should read --measuring--.

Signed and Sealed this

Eleventh Day of December, 199(

*Attest:*

HARRY F. MANBECK, JR.

*Attesting Officer*

*Commissioner of Patents and Trademarks*